US008200866B2

(12) United States Patent
Salman et al.

(10) Patent No.: US 8,200,866 B2
(45) Date of Patent: **\*Jun. 12, 2012**

(54) REDUCED KEYPAD FOR A MOBILE COMMUNICATION DEVICE FOR PREDICTIVE INPUT

(75) Inventors: Majeed D. Salman, Redmond, WA (US); G. Eric Engstrom, Kirkland, WA (US)

(73) Assignee: Varia Holdings LLC, Brooklyn, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 11/547,826

(22) PCT Filed: Feb. 17, 2005

(86) PCT No.: PCT/US2005/005013
§ 371 (c)(1),
(2), (4) Date: Oct. 6, 2006

(87) PCT Pub. No.: WO2005/109644
PCT Pub. Date: Nov. 17, 2005

(65) Prior Publication Data
US 2008/0122658 A1     May 29, 2008

Related U.S. Application Data

(60) Provisional application No. 60/565,638, filed on Apr. 27, 2004, provisional application No. 60/566,676, filed on Apr. 30, 2004, provisional application No. 60/567,214, filed on Apr. 30, 2004, provisional application No. 60/566,704, filed on Apr. 30, 2004.

(51) Int. Cl.
*G06F 13/12* (2006.01)
*G06F 13/38* (2006.01)
*H03M 11/00* (2006.01)
*H03K 17/94* (2006.01)

(52) U.S. Cl. ............... 710/67; 341/22; 341/23; 341/28; 341/34; 345/168; 345/171

(58) Field of Classification Search ......... 11/67; 710/67
See application file for complete search history.

(56) References Cited

U.S. PATENT DOCUMENTS 2,040,248 A * 5/1936 Dvorak et al. ............... 400/486
(Continued)

OTHER PUBLICATIONS

International Telecommunication Union, Telecommunication Standardizaion Sector of ITU Q.23, 1988, Extract from the Blue Book, "Technical Features of Push-Button Telephone Sets".*

(Continued)

*Primary Examiner* — Chun-Kuan Lee
*Assistant Examiner* — Brooke Dews
(74) *Attorney, Agent, or Firm* — Schwabe, Williamson & Wyatt, P.C.

(57) ABSTRACT

An apparatus (600) is provided with a first (635) and a second (645) plurality of input keys. At least some input keys of the first plurality of input keys are associated with both a numeric value and a first set of alphabetic values, and arranged in a first alphabetic keypad layout based on their respective first sets of alphabetic values. The second plurality of input keys are positioned adjacent to the first plurality of input keys. At least some input keys of the second plurality of input keys are associated with at least one alphabetic value, and arranged in a second alphabetic keypad layout. At least some of the input keys of the first plurality of input keys have a second set of alphabetic values that is used as part of the second alphabetic keypad layout and at least some of the input keys of the first and second pluralities of input keys are arranged to provide a reduced group of words generated by a predictive text input routine for an input key sequence entered by a user.

25 Claims, 9 Drawing Sheets

U.S. PATENT DOCUMENTS

| | | | |
|---|---|---|---|
| 4,677,659 A * | 6/1987 | Dargan | 379/93.27 |
| 5,584,588 A * | 12/1996 | Harbaugh | 400/486 |
| 5,660,488 A | 8/1997 | Miller | |
| 5,673,256 A | 9/1997 | Maine | |
| 5,900,867 A | 5/1999 | Schindler et al. | |
| 5,963,671 A | 10/1999 | Comerford et al. | |
| 6,275,216 B1 | 8/2001 | Kitamura | |
| 6,295,052 B1 | 9/2001 | Kato et al. | |
| 6,348,878 B1 | 2/2002 | Tsubai et al. | |
| 6,378,234 B1 | 4/2002 | Luo | |
| 6,643,371 B2 | 11/2003 | Mager | |
| 6,703,963 B2 | 3/2004 | Higginson | |
| 6,885,318 B2 | 4/2005 | Bickerton | |
| 6,986,614 B2 | 1/2006 | McLoone | |
| 7,084,858 B2 | 8/2006 | Anson et al. | |
| 7,154,480 B2 | 12/2006 | Iesaka | |
| 7,187,364 B2 | 3/2007 | Duarte et al. | |
| 7,257,430 B2 | 8/2007 | Lenchik et al. | |
| 2002/0136372 A1 | 9/2002 | Bozorgui-Nesbat | |
| 2003/0038735 A1 * | 2/2003 | Blumberg | 341/22 |
| 2003/0085870 A1 | 5/2003 | Hinckley | |
| 2003/0227745 A1 | 12/2003 | Khoo | |
| 2004/0027335 A1 | 2/2004 | Lin | |
| 2004/0145564 A1 | 7/2004 | Duarte et al. | |
| 2004/0164951 A1 * | 8/2004 | Lun Pun et al. | 345/156 |
| 2004/0165924 A1 * | 8/2004 | Griffin | 400/486 |
| 2004/0203513 A1 * | 10/2004 | Kwon | 455/90.3 |
| 2005/0104869 A1 * | 5/2005 | Chung | 345/179 |
| 2005/0136853 A1 | 6/2005 | Lenchik et al. | |
| 2006/0263137 A1 | 11/2006 | Griffin | |

OTHER PUBLICATIONS

International Telecommunication Union Standardization Sector Q.23.*
International Search Report, mailed Jul. 15, 2005 for application PCT/US05/05054.
International Preliminary Report on Patentability, mailed Jul. 14, 2005 for application PCT/US05/05013.
International Search Report, mailed Jul. 14, 2005 for application PCT/US05/05013.
International Preliminary Report on Patentability, mailed Jul. 15 2005 for application PCT/US05/05054.
International Search Report, mailed Aug. 17, 2006 for application PCT/US05/05008.
International Preliminary Report on Patentability, mailed Aug. 17, 2006 for application PCT/US05/05008.

* cited by examiner

REDUCED KEYPAD FOR A MOBILE COMMUNICATION DEVICE FOR PREDICTIVE INPUT

RELATED APPLICATIONS

This application claims the benefit of priority from Provisional Application Ser. No. 60/565,638 filed Apr. 27, 2004, Provisional Application Ser. No. 60/566,676 filed Apr. 30, 2004, Provisional Application Ser. No. 60/567,214 filed Apr. 30, 2004, and Provisional Application Ser. No. 60/566,704, filed Apr. 30, 2004, all of which applications are fully incorporated herein by reference.

TECHNICAL FIELD

The present disclosure is related to the field of electronic device user interfaces. More specifically, but not exclusively, the present disclosure relates to the design of input mechanisms for use in mobile electronic devices.

BACKGROUND INFORMATION

Mobile electronic devices have become ubiquitous in today's fast paced society. Various portable or mobile handheld devices can perform multiple tasks as well as provide multiple communication systems. For example, the personal digital assistant ("PDA") cellular telephone, in addition to serving as a personal organizer and cellular phone, may also provide text messaging, paging, and Internet connectivity. Providing a user-friendly interface, however, can be a challenge for manufacturers because of the limited surface area available on the usually handheld devices.

The traditional, non-portable computer desktop has generally utilized an input keyboard having a QWERTY keyboard layout, a keyboard layout that gained its name from the first six letters of the top row that spell "QWERTY." Most users are familiar with the QWERTY layout and many mobile electronic devices have a miniaturized QWERTY keyboard. Use of keys on a miniaturized QWERTY keyboard, however, can be difficult due to reduced key size and spacing.

Other mobile devices, such as a simple cellular telephone, may include only a conventional 12-key telephone keypad. Several methods have evolved for entering text on the telephone keypad, such as for example, multi-tap input or predictive text input (e.g., T9 Text Input™ by America Online, Inc., of Dulles, Va.). Despite such methods, entering alphabetic characters via a typical 12-key telephone keypad may remain inefficient for users because the telephone keypad is not designed for text entry.

DETAILED DESCRIPTION

Embodiments of the present invention include, but are not limited to, a reduced keypad for a mobile electronic device.

Parts of the description will be presented in terms such as portable or mobile electronic devices. As well understood by those skilled in the art, the term "portable/mobile electronic device" as used herein (hereafter, simply "electronic device"), including in the claims, comprise wireless mobile phones, PDAs, and the like.

The term "wireless mobile phone" as used herein refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

In the following description, various aspects of the illustrative embodiments will be described. It will be apparent, however, to those skilled in the art that alternate embodiments of the present invention may be practiced with all or only some aspects of the described embodiments. For purposes of explanation, specific numbers, materials and configurations are set forth in order to provide a thorough understanding of the described embodiments. However, it will be apparent to one skilled in the art that alternate embodiments of the present invention may be practiced without the specific details. In other instances, well-known features are omitted or simplified in order not to obscure the illustrative embodiments.

Various operations will be described as multiple discrete steps, in a manner that is most helpful in understanding the described embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

The embodiments are described herein with respect to a character set or alphabetic values based on the English language. It is to be recognized that the invention may be practiced with characters of other languages as well.

"Activation" means an affirmative action by a user to provide a value associated with a key as input to the electronic device. Key activations may include a traditional mechanical key that, when pressed, causes the key to contact a switch on a circuit board located beneath the key. Alternatively, key activations may mean the touching by a user (or stylus) of a pressure sensitive key or a capacitive or resistive touch sensitive surface, as well as on "soft" keys on a touch-sensitive display.

While embodiments of the present invention are described with respect to their improvements over a conventional telephone keypad as well as a miniaturized "QWERTY" keyboard or a reduced QWERTY keyboard, one skilled in the art will recognize that alternate embodiments of the present invention may be practiced with respect to other keyboard layouts, such as a Dvorak keyboard and the like. Moreover, while the present invention is described with respect to an improvement over a miniaturized QWERTY keyboard, the present invention may be practiced with standard-sized keyboards in an attempt to enhance their functionality as well.

Figure 1:
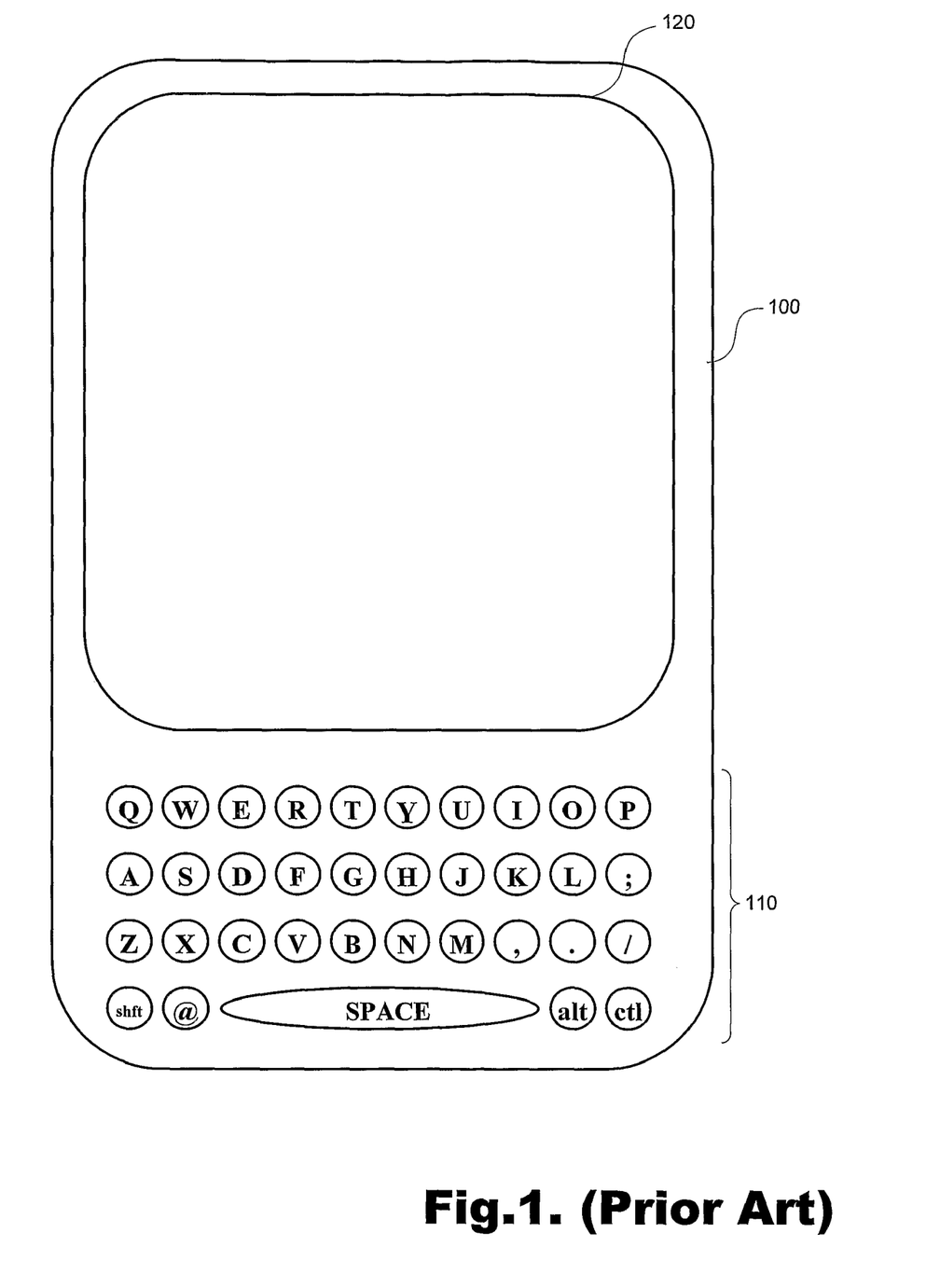
FIG. 1 illustrates a prior art, mobile electronic device including a miniaturized QWERTY keyboard for inputting data.

FIG. 1 illustrates an example prior art portable electronic device 100 utilizing a miniaturized QWERTY keyboard 110 for inputting data. Note that a relatively large display 120 leads to a reduced amount of surface area available for an input keyboard such as miniaturized QWERTY keyboard 110, which keys are illustrated very close to their actual sizes. In contrast to standard QWERTY keyboards in use with desktop and larger computers, miniaturized QWERTY keyboards on portable electronic devices typically have a limited key set. If the miniaturized QWERTY keyboard has numeric values, the values will frequently be located along the top row of keys, an arrangement often inefficient for user entry of telephone numbers. Furthermore, competing interface requirements on the keyboard have resulted in a reduction in spacing between input keys as well as a reduction in size. Frequently, users will activate input keys inadvertently due to the close proximity and size of the input keys. This affects the ability of a user to input data to electronic device 100.

Figure 2:
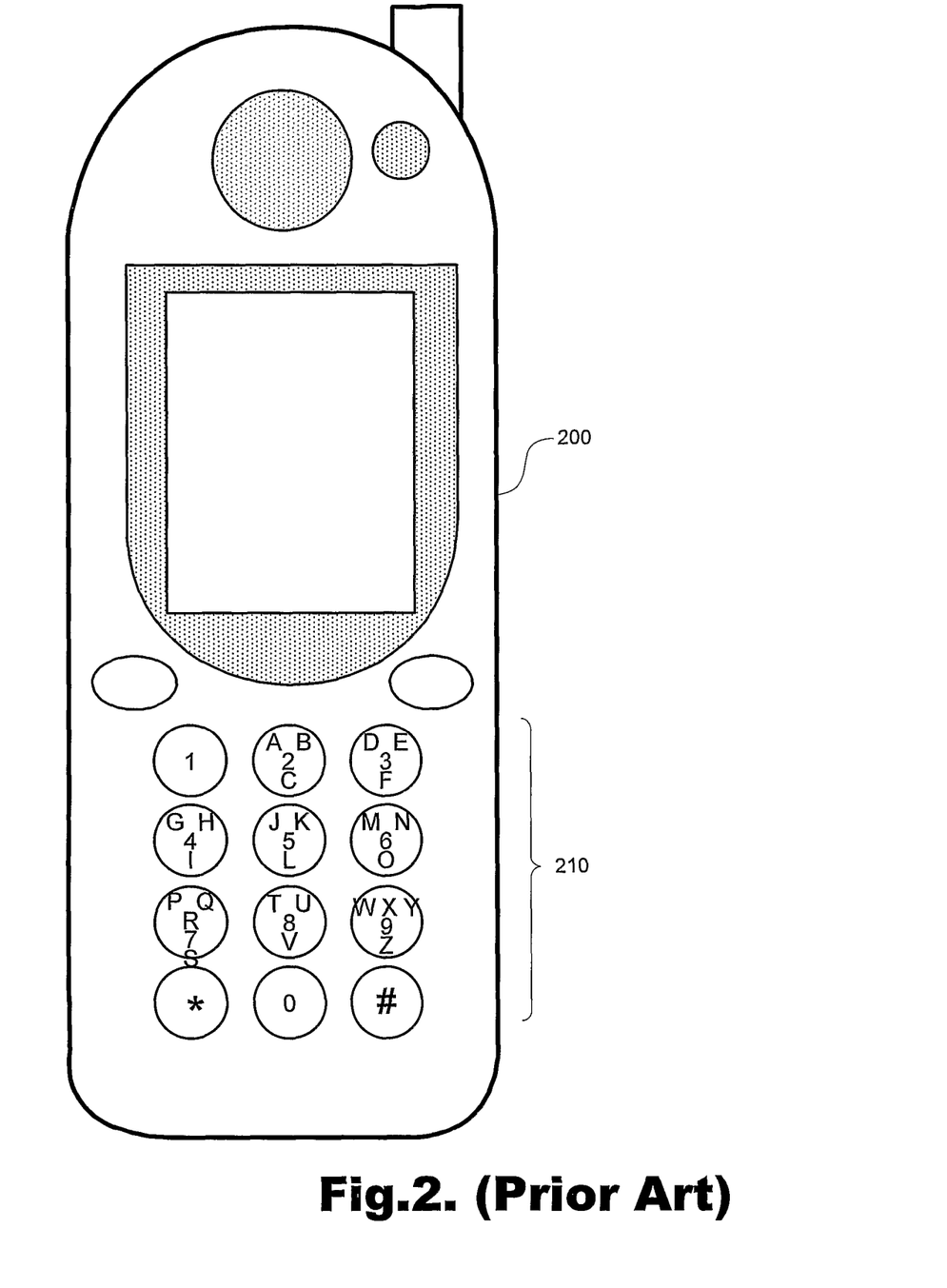
FIG. 2 illustrates a prior art, mobile telephone device including a conventional telephone keypad for inputting data.

Other mobile devices include simply a conventional telephone keypad. FIG. 2 shows an example prior art keypad 210 on a mobile telephone device 200, which keys are also illustrated very close to their actual sizes. One method for entering alphabetic values via a telephone keypad 210 is generally known as multi-tap input. In order for a user to enter text using multi-tap input, an alphabetic value is selected by repeatedly activating a corresponding input key until the desired value appears. For example, a user may activate the input key associated with the numeric value "2" once for "a", twice for "b" or three times for "c." Thus, traditional multi-tap input requires multiple activations of a single input key in order to enter an alphabetic value.

Another method used for entering text on mobile telephone device 200 includes predictive text entry (T9 Text Input™). Using predictive text entry, a user activates each input key only once to enter each alphabetic value of an input activation key sequence representing a word. Software may then produce a group of word possibilities or multiple word matches for the particular input key sequence entered by the user. If the desired word is correctly "predicted", the user then selects it from the list.

Figure 3:
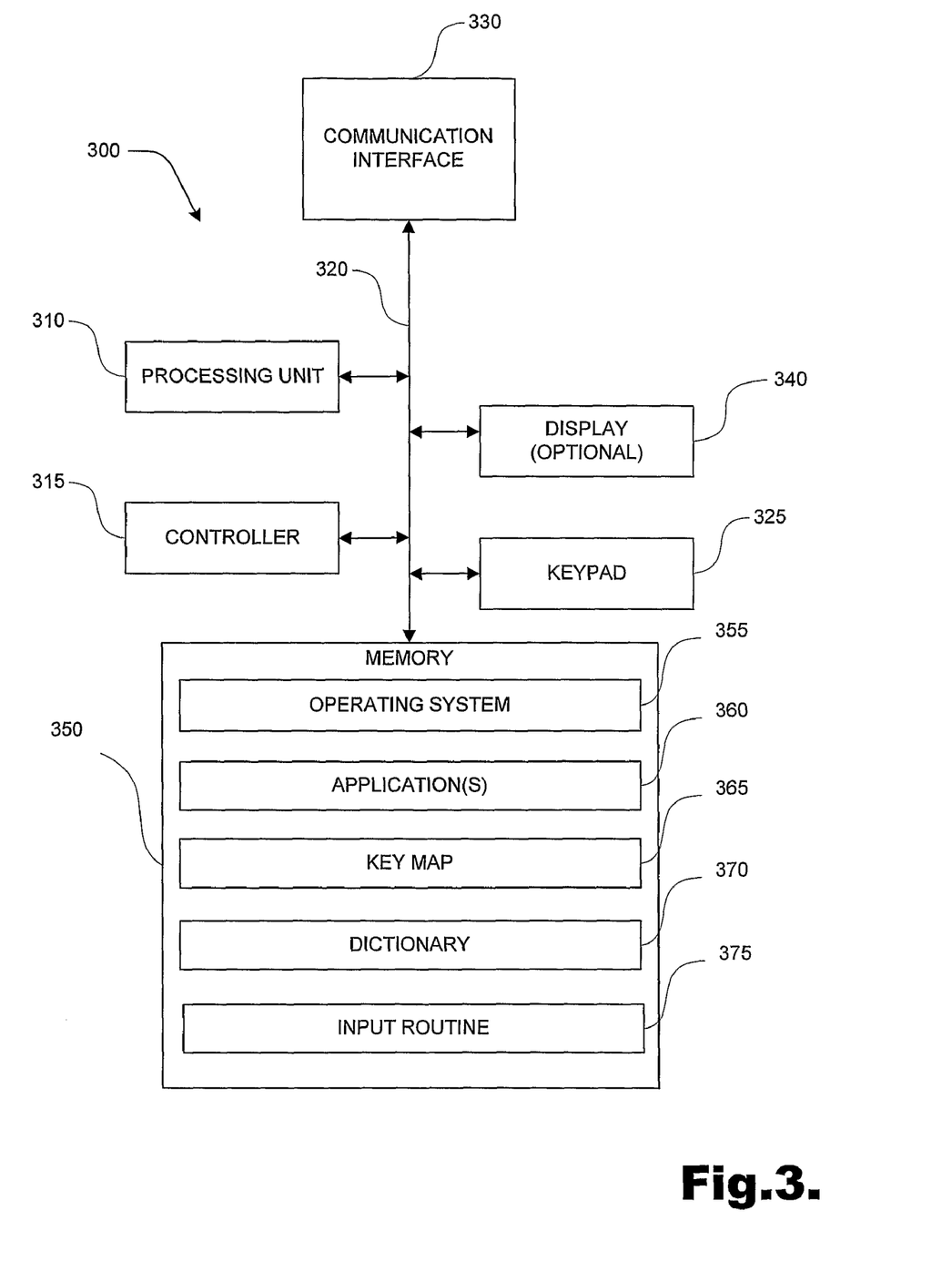
FIG. 3 illustrates a block diagram view of a computing environment, in accordance with an embodiment.

Referring now to FIG. 3, wherein an exemplary electronic device 300 suitable for use in embodiments of the present invention is shown. Those of ordinary skill in the art and others will appreciate that electronic device 300 may include many more components than those shown in FIG. 3. However, it is not necessary that all of these generally conventional components be shown in order to disclose an enabling embodiment of the present invention.

As shown in FIG. 3, electronic device 300 includes an optional (wire line based or wireless) communications interface 330 for connecting to remote device(s) (not shown). Communications interface 330 includes the necessary circuitry, driver and/or transceiver for such a connection and is constructed for use with the appropriate protocols for such a connection. Electronic device 300 also includes a processor or processing unit 310, a controller 315, a reduced keypad 325, a display 340 and a memory 350, all interconnected along with the communications interface 330 via a bus 320. Memory 350 generally comprises random access memory ("RAM"), a read only memory ("ROM") and a non-volatile mass storage device, such as a disk drive, flash memory, or the like. Memory 350 stores an operating system 355, a key map 365, a dictionary 370, and an input method routine 375 formed in accordance with embodiments of the present invention. In an embodiment, input method routine 375 may include an input routine having a multi-tap input subroutine, a predictive text input subroutine, or both.

In various embodiments, memory 350 also stores application(s) 360. It will be appreciated by those of ordinary skill in the art and others, that while key map 365, dictionary 370, input routine 375 and applications 360 are described as separate individual software components, they may actually be combined, comprised of multiple software components; or may in fact be sub-parts of one or more integrated software components. In particular, input routine 375 may be integrated with applications 360 or operating system 355. Additionally, while key map 365 and input routine 375 are illustrated as software components (e.g., part of the operating system, or a discrete application), in alternate embodiments, they may be hardware components of electronic device 300.

It will be appreciated that the software components may be loaded from a computer readable medium into memory 350 of the host computer or electronic device 300 using a drive mechanism (not shown) or network mechanism (not shown) associated with the computer readable medium, such as a floppy, tape, DVD/CD-ROM drive, flash RAM, network interface card, or communications interface 330.

Further, communication interface 330 may be designed to support one or more signaling protocols, including but not limited to Code Division Multiple Access ("CDMA"), Time Division Multiple Access ("TDMA"), Global System for Mobile Communications ("GSM"), General Packet Radio Service ("GPRS") and so forth. Moreover, communication interface 330 may be implemented using a separate transmitter and receiver.

Electronic device 300 contains a reduced keypad 325 for providing input to electronic device 300. In accordance with the present invention, each input key on reduced keypad 325 is associated with one or more alphabetic and/or numeric values. In aggregate, a reduced keypad has fewer keys than the limited keyboard shown in prior art QWERTY keyboard 110 and obviously fewer keys than a standard QWERTY keyboard layout. However, in various embodiments, the reduced keypads of the present invention may provide more data entry or input keys than the simple telephone keypads, such as conventional telephone keypad 210. In one embodiment, the input keys may be arranged in a manner to provide a reduced group of word possibilities generated by a predictive text input routine associated with an input key activation sequence entered by a user. This may allow the user to more quickly and efficiently select the desired word.

Figure 4:
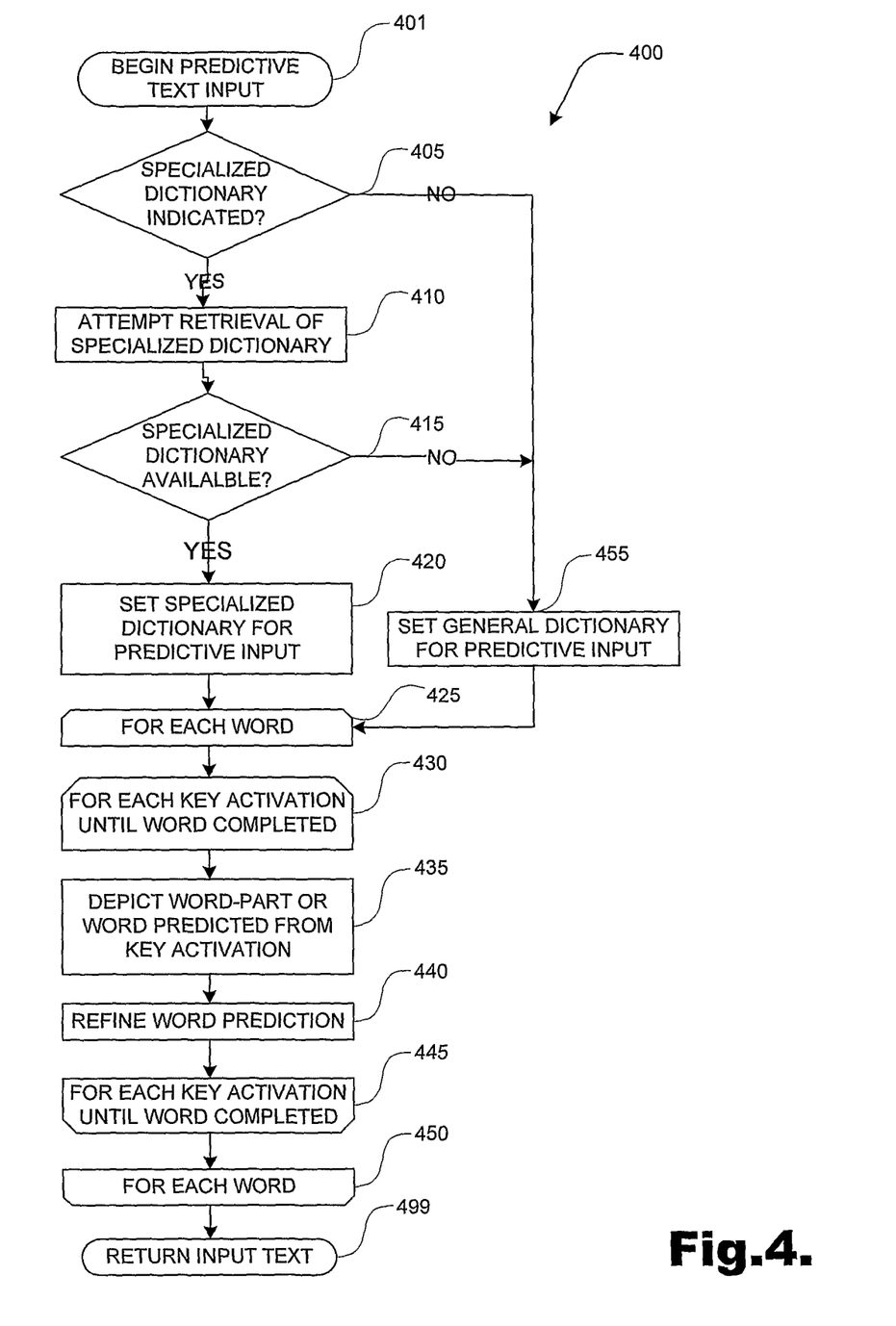
FIG. 4 illustrates a flow diagram of a predictive text input subroutine, in accordance with an embodiment.

FIG. 4 illustrates an example process 400 associated with a predictive text input subroutine in accordance with one embodiment of the present invention. The predictive text input subroutine begins at block 401 and proceeds to a decision block 405 where a determination is made whether a specialized dictionary has been indicated for use with the current text input. If so, processing proceeds to block 410 where an attempt is made to retrieve the specialized dictionary for use with the current text input. If in decision block 415 it was determined that the specialized dictionary was available, then in block 420 the specialized dictionary is set for predictive input. However, if in decision block 405 it was determined that a specialized dictionary was not indicated, processing proceeds to block 455 where a general dictionary is set for predictive input. Similarly, if in decision block 415 it was determined that a specialized dictionary was not available, processing likewise proceeds to block 455.

Those of ordinary skill in the art and others will appreciate that predictive text input utilizes the ambiguous associations between entered alphabetic values or characters and words or partial words that contain one or more of the entered characters in an order they are entered on the keypad. For example, utilizing a conventional 12-key telephone keypad and the associated character associations with the numbers 2-9 (see FIG. 2) on the keypad, a predictive text input for the word "cool" would be input with the 2-6-6-5 keys. Unfortunately, the predictive text for the word "book" is also 2-6-6-5. This confusion results from there being too many character associations with particular input keys on a keypad. Accordingly, embodiments of the present invention increase the number of input keys on a conventional telephone keypad and also provide an arrangement of input keys or displayed characters that reduce these types of "collisions" of words which are multiple word matches from ambiguous input from the user.

Returning to predictive input subroutine 400, once a dictionary has been set, either in block 420 or 455, processing proceeds to looping block 425. Looping block 425 begins an iteration through each word (e.g., a group of characters separated by white space from other characters). Next, in looping block 430, an iteration for each key activation is performed until a word is completed (e.g., a white space is received, white space is any type of word separating data such as a space, tab, line feed, carriage return, and the like). Next, in block 435, a word part or word predicted from current key activations is depicted on the display 340 of electronic device 300. In block 440 the word prediction is refined (e.g., from user inputs or specialized dictionary knowledge, past user behavior, and the like). Processing then proceeds to looping block 445, which cycles back to looping block 430 until a word has been completed. Processing then proceeds to looping block 450, which cycles back to looping block 425 for each word. Once all the words have been entered, processing proceeds to block 499 where the input text from the predictive text input subroutine 400 is returned to a calling routine.

Figure 5:
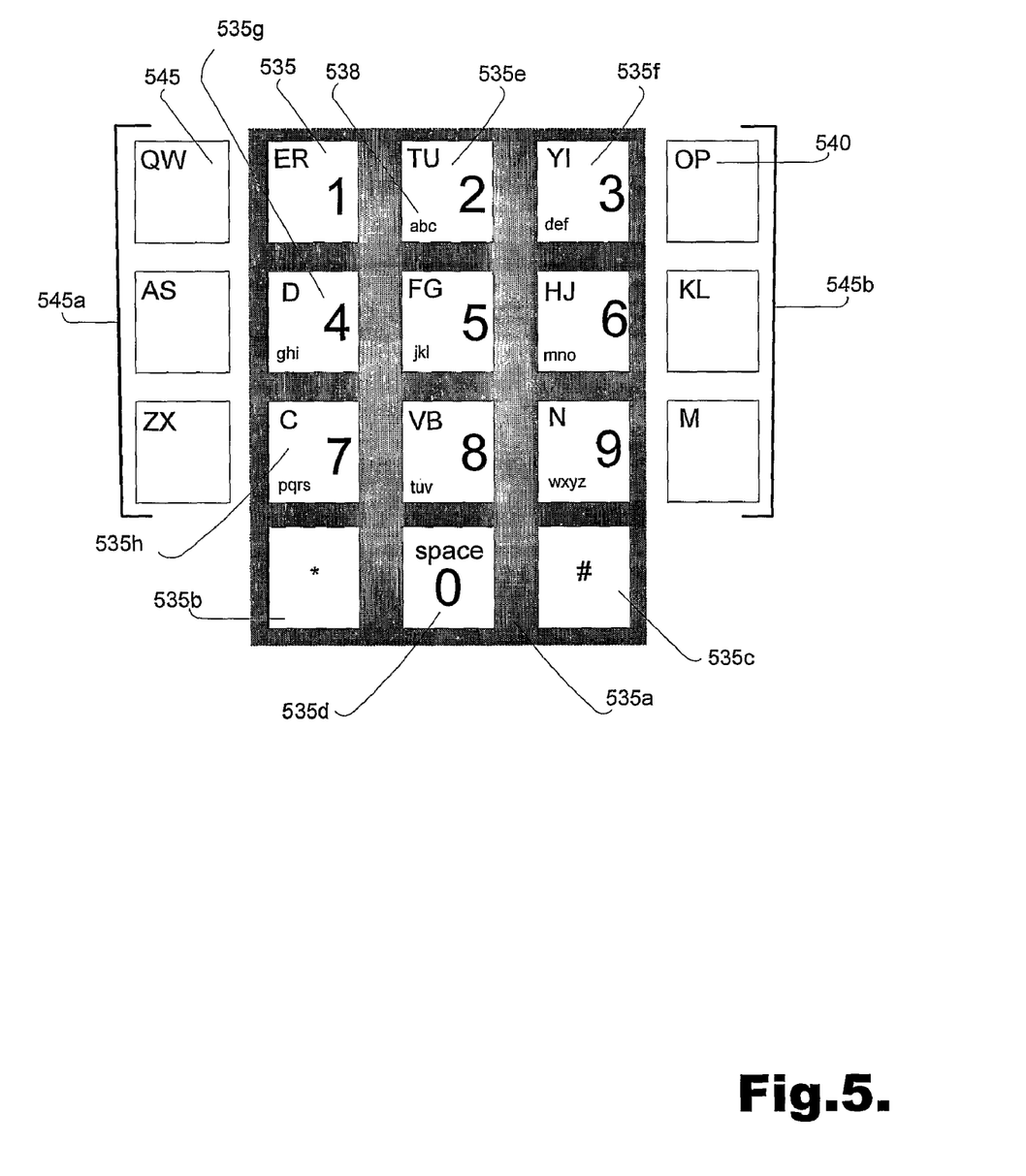
FIG. 5 illustrates an example of a reduced keypad in accordance with an embodiment.

Next, FIG. 5 illustrates a top view of a reduced keypad 525 according to an embodiment. In the embodiment, reduced keypad 525 may have an arrangement of input keys that enhances predictive text input by reducing a list or group of words generated as possible word choices during a predictive text input routine. In one embodiment, reduced keypad 525 increases a number of keys on a keypad (as compared to a conventional telephone keypad), thereby reducing a number alphabetic values associated with a particular input key, so as to reduce multiple word matches or "collisions" of words. Furthermore, the arrangement of input keys may be determined by using collision analysis for each alphabetic value when used in full word combinations with other alphabetic values to determine efficient key-sharing arrangements on a reduced keypad. This determination may take into account user familiarity with keypad layouts to preserve a familiar input keypad arrangement, while still reducing word collisions.

Thus, in the illustrated embodiment, reduced keypad 525 may be arranged in four rows and include a first plurality of input keys 535 (as included in shaded area 535a), partially surrounded on a left and a right side by a second plurality of input keys 545 (indicated by reference lines 545a and 545b). For the embodiment, at least some of first plurality of input keys 535 may be associated with a numeric value 0-9 and a first set of alphabetic values 538 to form a telephone keypad layout based on the first plurality of input keys' numeric values and respective first sets of alphabetic values 538. Each of the input keys of the first and second pluralities of input keys 535 and 545 may be associated with one or more non-alphabetic or non-numeric values as well. Thus, as illustrated, the bottom row of first plurality of input keys 535 may also include input keys 535b and 535c associated with at least an asterisk and a pound symbol, respectively.

In the illustrated embodiment, at least some of first plurality of input keys 535 and second plurality of input keys 545 may be associated with a second set of alphabetic values 540, located e.g., on an upper portion of each input key. In contrast to each of first sets of alphabetic values 538, which may include one or more alphabetically ordered letters, each of second sets of alphabetic values 540 may include one or more letters arranged to be compatible with a modified or "Quasi-QWERTY" keyboard layout. Thus, in an embodiment, each of first plurality of input keys 535 may be arranged relative to each of adjacent or partially surrounding second plurality of input keys 545 to form a modified QWERTY keyboard layout wherein at least some of the input keys are arranged to reduce a number of word collisions associated with an input key activation sequence (or simply, "input key sequence") by a user.

Thus, in the illustrated embodiment, because alphabetic values "U" and "I" are both vowels and may be ambiguously associated with a high number of words, "U" and "I" may be positioned on separate input keys to reduce a group of words generated during a predictive text input routine. Thus, input key 535e (the "2" input key) may be associated with second alphabetic set "TU" and input key 535f (the "3" input key) may be associated with second alphabetic set "YI," (rather than "TY" and "UI", respectively, as in a strictly QWERTY arrangement). Further, note that several input keys may only be associated with a single alphabetic value. Among them, for example, input key 535g (the "4" input key) may be associated with a single alphabetic value "D" and input key 535h (the "7" input key) may be associated with the single alphabetic value "C." Such a shift of a few values may advantageously provide a reduced set of word collisions when using predictive input for entering alphabetic values in the English language, thus making textual input faster and more efficient for a user.

Note that for clarity, only one input key 535, one input key 545, one set of first set of alphabetic values 538, and one set of second set of alphabetic values 540 have been labeled in the figure. Furthermore, please note that in the embodiment shown, although input keys 545 may include two groups of keys substantially disposed on a left and a right side of input keys 535, in alternate embodiments, second plurality of input keys 545 may be disposed at other suitable locations relative to first plurality of input keys 535 to facilitate the formation of the modified QWERTY keyboard layout or other suitable layout (see FIG. 7 and accompanying description). In another embodiment, another suitable layout formed by first and second pluralities of input keys 535 and 545 may include a modified Dvorak keyboard layout or other keyboard layout.

Additionally, as noted previously, in various embodiments, first plurality of input keys 535 or second plurality of input keys 545 may include one or more input keys associated with one or more non-alphabetic or non-numeric values. Examples of such associated values include but are not limited to, punctuation marks, special symbols or characters, device commands or other suitable values. In one embodiment, device command values may include function keys, cursor-control keys, or modifier keys. For example, as referenced above and shown in FIG. 5, input keys 535b and 535c, may include an asterisk or pound symbol on their respective keys. Further, in the embodiment shown, first plurality of input keys 535 includes an input key 535d associated with device command value of "space" (for "space bar") as well as numeric value "0."

Note also that although in FIG. 5, each of first and second sets of alphabetic values 538 and 540, the numeric values, and non-alphabetic and non-numeric values are displayed on particular portions of the input keys (i.e., upper, lower, central portions), in alternate embodiments, the values may be displayed on varying portions of the input keys. Also, note that in alternate embodiments, within the spirit and scope of the invention, input keys of the first and second pluralities of input keys 535 and 545 may be associated with more or fewer values and are not limited to the specific associated values as shown in FIG. 5.

In one embodiment, there may be a toggle button or an input key for activation of a Quasi-QWERTY mode or a telephone keypad mode. Thus, a user may input data using a Quasi-QWERTY layout for textual input and a telephone keypad layout for entry of telephone numbers and the like. As discussed previously, for a user to input data into electronic device 300, in an embodiment, reduced keypad 525 may be used with a predictive input mode of entry. Thus, in one embodiment, memory 350 coupled to the input keys may include a database or a dictionary 370 from which a group of words associated with an entered key sequence can be generated during the predictive text input process. Furthermore, in an embodiment, memory 350 may include one or more specialized dictionaries (as referenced in FIG. 4 and accompanying description).

Figure 6:
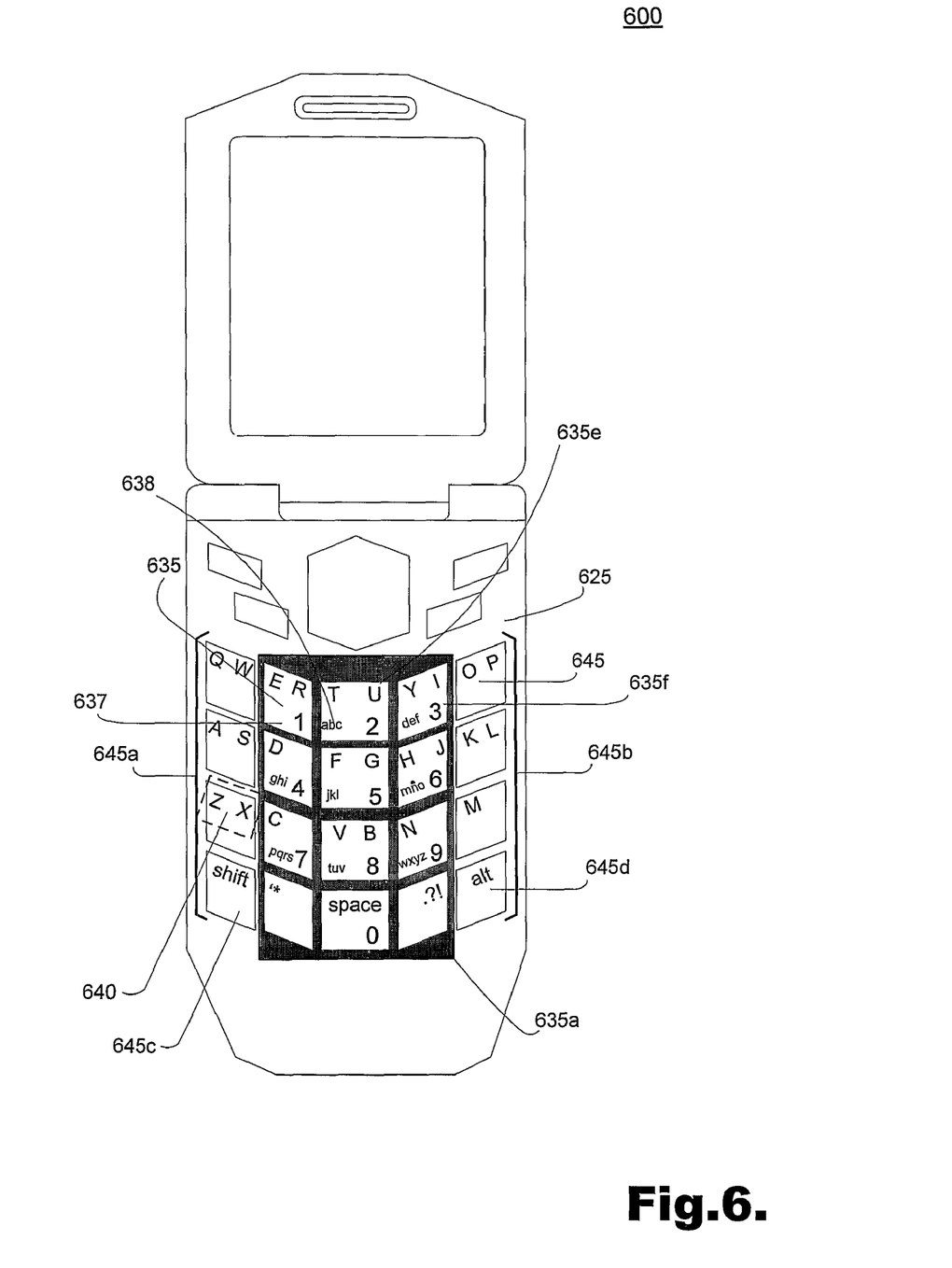
FIGS. 6 and 6A illustrate a mobile electronic device having a reduced keypad in accordance with an embodiment.

Next, FIG. 6 illustrates an example electronic device 600 including a reduced keypad 625 according to one embodiment. In the illustrated embodiment, electronic device 600 may be a cellular phone. For the embodiment, electronic device 600 includes a first plurality of input keys 635 (as included in shaded area 635a), some of the first plurality of input keys 635 having displayed thereon a numeric character 637. At least some of first plurality of input keys 635 also having displayed thereon a first alphabetic character set or first set of alphabetic values 638. Note that for the embodiment, each of first plurality of input keys 635 is arranged in a numeric and alphabetic telephone keypad layout.

Thus, in the illustrated embodiment, input keys of first plurality of input keys 635 having numeric values 2-9 may also have displayed thereon a first set of alphabetic values 638, having approximately three or four alphabetically ordered letters, in accordance with the embodiment. Note that, in an embodiment, correspondence between each of the numeric keys and alphabetically ordered letters of first set of alphabetic values 638 is substantially the same as the correspondence between each of the numeric keys and letters of a conventional telephone keypad. Furthermore, in an embodiment, each of the alphabetically ordered letters of first set of alphabetic values 638 corresponds to a DTMF signal substantially consistent with a DTMF signal corresponding to the alphabetically ordered letters or values of a conventional telephone keypad layout. This may allow mnemonic phone numbers, such as 1-800-FLOWERS, and the like, to be entered in the same manner as on a conventional telephone keypad because the correspondence between each letter and numeric key is compatible.

In a similar manner to the keypad of FIG. 5, a second plurality of input keys 645 may be positioned adjacent to or partially surrounding first plurality of input keys 635. Second plurality of input keys 645 may include 2 groups of keys substantially disposed on a left and a right side of first plurality of input keys 635 as indicated by reference lines 645a and 645b, respectively. At least some of first plurality of input keys 635 and second plurality of input keys 645 may have displayed thereon a second alphabetic character set or second set of alphabetic values 640.

In an embodiment, each of first plurality of input keys 635 may be arranged relative to each of partially surrounding second plurality of input keys 645 to form an alphabetic arrangement different from the alphabetic keyboard arrangement of a telephone keypad. In one embodiment, a QWERTY keyboard layout modified to enhance predictive text input may be formed in conjunction with first plurality of input keys 635. Note that, as in keypad 525, input key 635e has displayed thereon "T U", rather than "T Y" and input key 635f has displayed thereon "Y I" rather than "U I" to reduce word collisions that may occur during a predictive input routine. Thus, in one embodiment, the displayed alphabetic character sets are arranged to reduce multiple word matches associated with an entered key sequence.

Thus, in the illustrated embodiment, keypad 625 includes four rows of data entry keys or input keys. Each of the input keys may be assigned a set of characters from a plurality of sets, wherein the plurality of sets includes at least one character and at least the set Q, W, the set E, R, the set T, U, the set Y, I, the set O, P, the set A, S, the set D, the set F, G, the set H, J, the set K, L, the set Z, X, the set C, the set V, B, the set N, and the set M. In the embodiment, electronic device 600 includes a mobile communication device or mobile electronic device. In one embodiment, the device may include a communication interface to facilitate communication with a communication station of a wireless network service provider.

Note that for clarity in the figure, only one input key 635, one input key 645, one first set of alphabetic values 638, and one second set of alphabetic values 640 have been labeled. Further note that second plurality of input keys 645 includes an input key 645c associated with a value "SHIFT" which changes the letter case for character entry and an input key 645d associated with a value "ALT" which, in an embodiment, allows the user to select a word from multiple word matches from prediction, should they exist. Thus, in one embodiment keypad 625 includes a total of 20 input keys, rather than 18 input keys as shown in keypad 525.

Figure 6A:
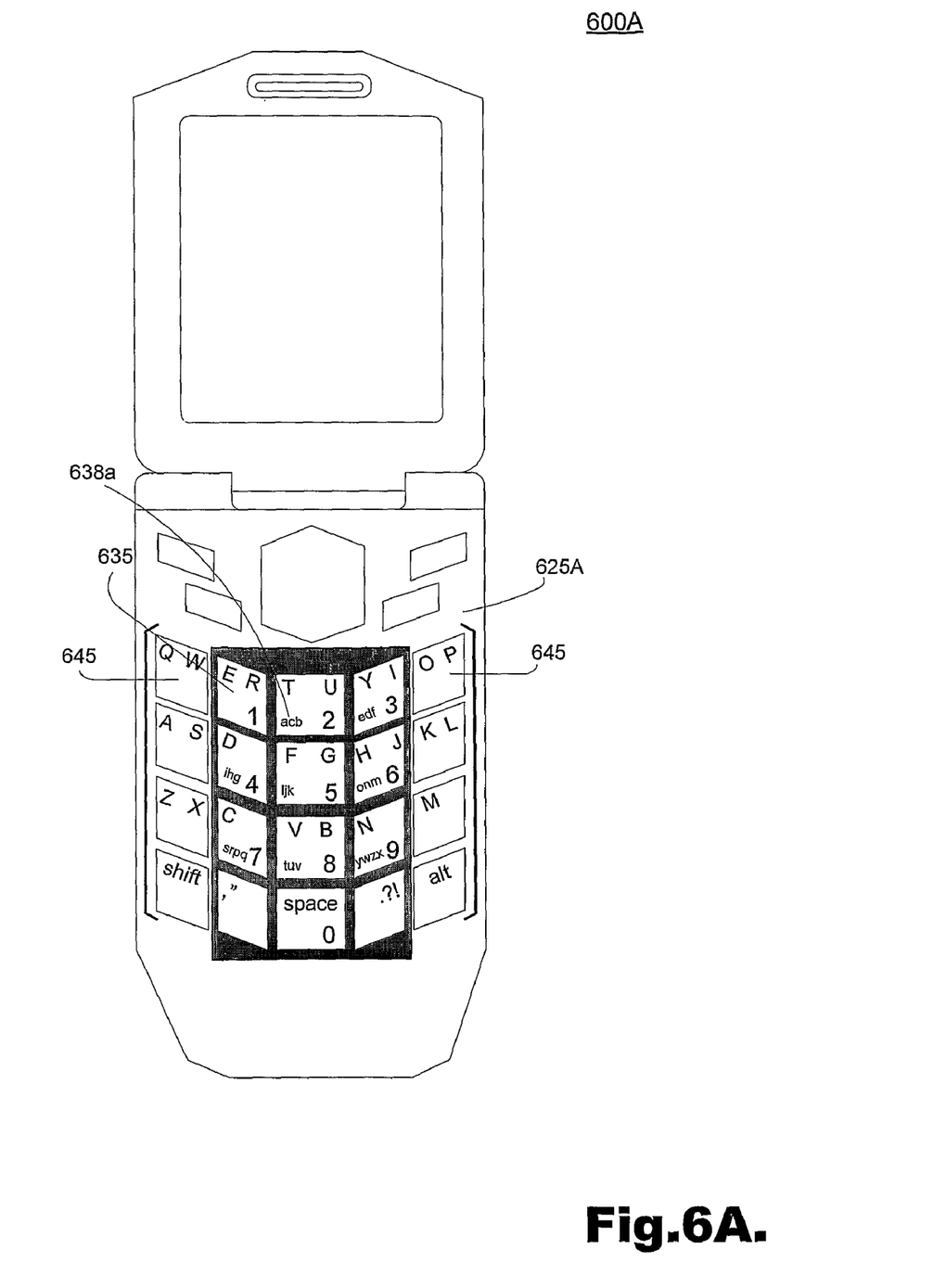

FIG. 6A illustrates an alternative embodiment of reduced keypad 625. In the embodiment shown in FIG. 6A, first sets of alphabetic values 638a of reduced keypad 625A includes groups or sets of alphabetic values having an order on some input keys based on a frequency of occurrence of the alphabetic values, rather than alphabetically ordered as in first sets of alphabetic values 638 on keypad 625. A telephone keypad including such an arrangement is further described in U.S. Pat. No. 6,643,371 (hereinafter '371 patent), filed Aug. 31, 2001. For the embodiment, letter-to-key correspondence matches a standard letter-to-key correspondence as illustrated in FIG. 5, but within a group of alphabetic values or letters, alphabetic values with a higher frequency of use may be positioned before alphabetic values with a lower frequency of use.

Thus, such an embodiment may be advantageous when using multi-tap entry in the telephone keypad mode. Thus, the alphabetic values having a higher probability of occurrence may be selected by a single activation of the input key and alphabetic values with a lower probability of occurrence are selected by activating the input key two or more times. For example, as illustrated in FIG. 6A, the input key associated with numeric value "2" has an associated first set of alphabetic values 638a of "acb," rather than "abc." In the embodiment, a standard correspondence between numeric input keys and alphabetic values of the alphabet is maintained for compatibility when entering mnemonic phone numbers and generating DTMF signals.

Additionally, note that in the embodiment, reduced keypad 625A of FIG. 6A (also illustrated in keypad 625 of FIG. 6) has been advantageously and ergonomically designed to arrange first and second pluralities of input keys 635 and 645 in a plurality of non-linear rows to form substantially a V-shape. The illustrated arrangement attempts to provide convenient access to the input keys by reducing strain on users' thumbs that may be caused by prior art keypad arrangements. When cradling electronic device 600A from the sides, the natural arcs of a user's thumbs create a "V" shaped region of movement.

Figure 7:
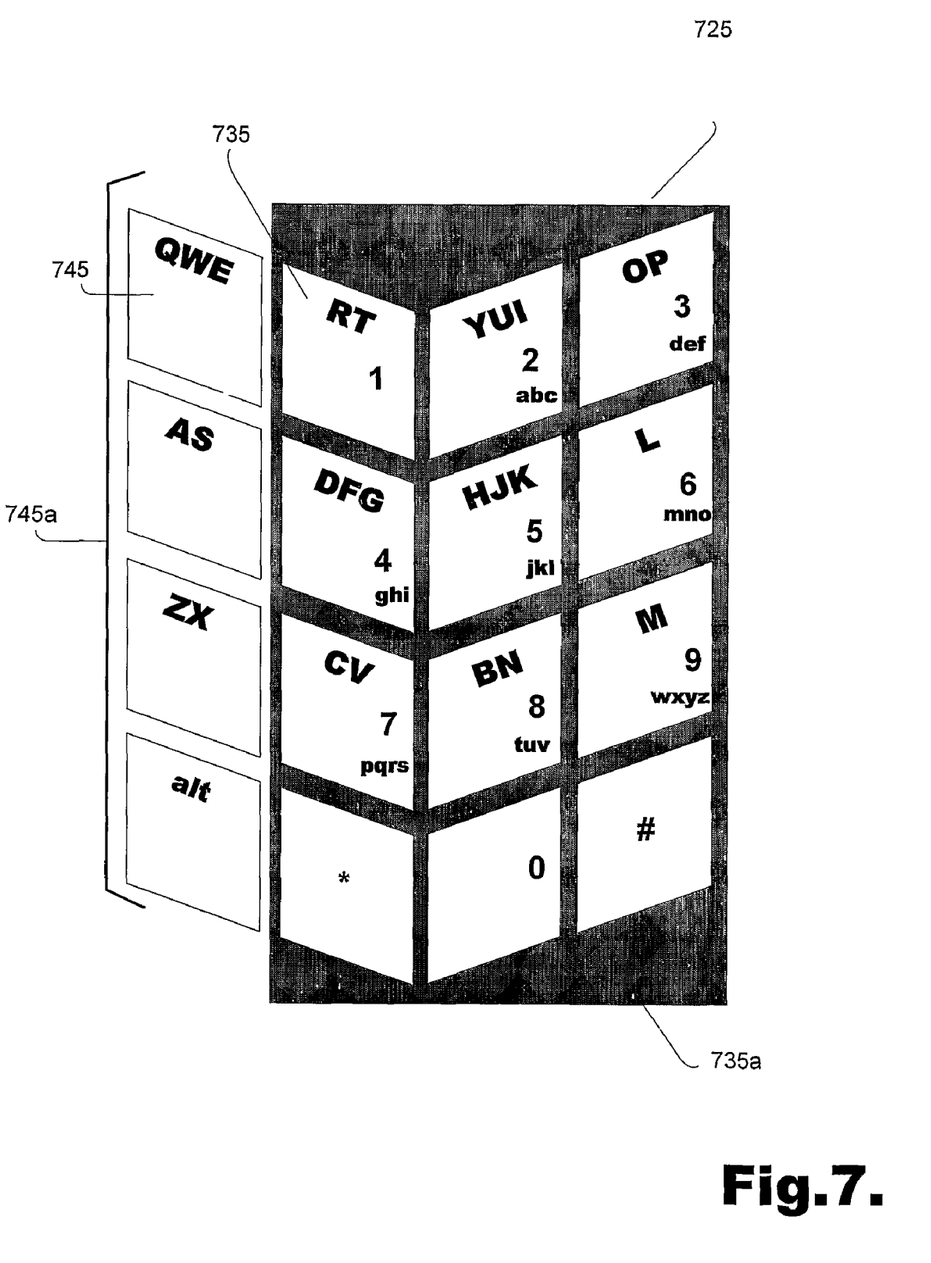
FIG. 7 illustrates a further example of a reduced keypad in accordance with an embodiment.

FIG. 7 illustrates a further embodiment. Keypad 725 may have a first plurality and a second plurality of input keys, at least some of the first plurality being associated with both a numeric value and a first set of alphabetic values and arranged in a telephone keypad layout. In the embodiment, a second plurality of input keys are positioned adjacent to the first plurality of input keys, and may be associated with at least one alphabetic value. At least some of the input keys of the second plurality of input keys may be arranged in a second alphabetic keypad layout, different from the first alphabetic keypad layout. Additionally, input keys of the first plurality of input keys may have a second set of alphabetic values that may be used as part of the second alphabetic keypad layout. Furthermore, at least some of the input keys of the second alphabetic keypad layout are arranged in a manner to provide a reduced group of words predicted during a predictive input routine of an input key sequence entered by a user and based on the second alphabetic keypad layout.

Specifically, FIG. 7 illustrates an embodiment wherein a reduced keypad 725 includes 16 input keys. In the illustrated embodiment, second plurality of input keys 745 (as indicated by reference line 745*a*) partially surrounds or is positioned adjacent to first plurality of input keys 735 on a left side of reduced keypad 725, rather than being disposed on both a left and a right side of the keypad as in reduced keypads 525 and 625. Furthermore, in the embodiment, the first and second pluralities of input keys are arranged in a plurality of non-linear rows to form a substantially V-shape. This embodiment provides a reduced keypad with fewer input keys than as illustrated in previous embodiments, while still providing a reduced number of alphabetic values associated with a particular input key as compared to a conventional telephone keypad. Thus, in the embodiment, first and second pluralities of input keys 735 and 745 may be arranged to reduce word collisions associated with an input key sequence entered by a user.

Thus, Quasi-QWERTY reduced keypads 525, 625, 625A, and 725 have an arrangement of characters that have been optimized involving collision analysis for each character or alphabetic value when used in full word combinations with other alphabetic values. This optimization allows for backwards engineering from such collision analysis to determine optimized input key-sharing arrangements on a reduced keypad. The optimizations also take into account user familiarity with input key layouts and use such knowledge to preserve a familiar input key arrangement, while still reducing word collisions. Furthermore, in an embodiment, a user may use a Quasi-QWERTY layout for textual input and a telephone keypad for entry of telephone numbers and the like.

Figure 8:
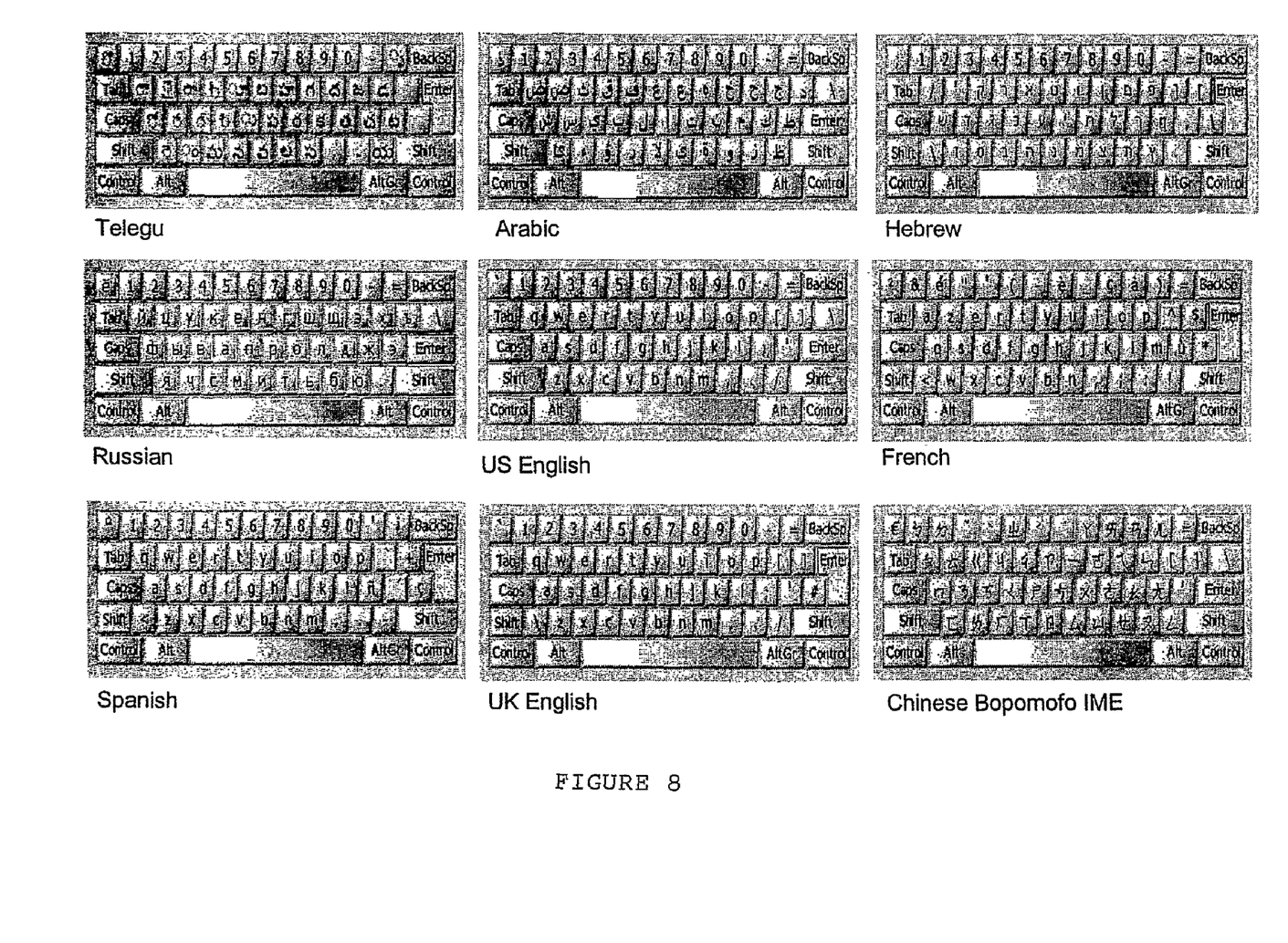
FIG. 8 illustrates six exemplary non-English language keyboard layouts that may be implemented in a reduced manner in accordance with embodiments of the invention

FIG. 8 illustrates six exemplary non-English language keyboard layouts that may be implemented in a reduced manner in accordance with embodiments of the invention. Illustrated from left to right and top to bottom, are keyboard layouts for the languages, Telegu, Hebrew, Russian, French, Spanish and Chinese. The present invention anticipates keypads that may be implemented from these and other similar keyboards in the reduced manner as earlier described for the modified English QWERTY keyboard.

Those of ordinary skill in the art will appreciate that the exemplary keyboard layouts of FIG. 8 and the exemplary keypads 525, 625, 625A, 625 and 725 are shown by way of illustration and are not meant to limit the scope of the present invention. It will be appreciated that although particular embodiments of the invention has been described in detail, various modifications and improvements can be made by a person skilled in the art without departing from the scope of the present invention.

What is claimed is:

1. An apparatus comprising:
a plurality of input keys collectively forming an alphabetic keypad layout and an alphanumeric keypad layout, wherein the plurality of input keys includes a first input key associated with an alphabetic character set of the alphabetic keypad layout and further associated with an alphanumeric character set of the alphanumeric keypad layout, the alphabetic character set including a first set of alphabetic characters and the alphanumeric character set including a number and a second set of alphabetic characters;
wherein the apparatus is configured to operate in a first mode to receive as input a first alphabetic character out of said first set of alphabetic characters in response to an activation of the first input key, and in a second mode to receive as input a second alphabetic character out of the second set of alphabetic characters in response to an activation of the first input key, the second alphabetic character out of the second set of alphabetic characters being separate and distinct from the first alphabetic character out of the first set of alphabetic characters; and
wherein the alphabetic keypad layout includes two or more alphabetic characters sequentially reordered to reduce a number of words generated by a predictive input routine; and
wherein:
the apparatus is configured, as part of receiving as input the first alphabetic character out of the first set of alphabetic characters in the first mode, to receive a single activation of the first input key; and
the apparatus is further configured, as part of receiving as input the second alphabetic character out of the second set of alphabetic characters in the second mode, to allow for selection of the second alphabetic character out of the second set of alphabetic characters through one or more consecutive activations of the first input key.

2. The apparatus of claim 1, wherein said two or more alphabetic characters are associated with separate input keys to provide a reduced number of alphabetic characters associated with a particular input key, and wherein the particular input key comprises a single alphabetic character.

3. The apparatus of claim 1, wherein said two or more alphabetic characters are associated with separate input keys to reduce word collisions during predictive text input by the user using the alphabetic keypad layout.

4. The apparatus of claim 1, wherein the input keys of the plurality of input keys are arranged in a plurality of non-linear rows to form a substantially V-shape.

5. The apparatus of claim 1, wherein the apparatus is a keyboard for use on a portable electronic device.

6. The apparatus of claim 1, wherein the apparatus is a portable electronic device.

7. The apparatus of claim 1 wherein the apparatus is a mobile communication device, further comprising a communication interface to facilitate communication with a communication station of a wireless network service provider.

8. An apparatus, comprising:
   a first plurality of input keys, at least one input key of the first plurality of input keys being associated in a first mode with an alphanumeric character set comprising a numeric character and one or more first alphabetic characters, and further associated in a second mode with an alphabetic character set comprising one or more second alphabetic characters, said at least one input key and at least some of the first plurality of input keys being arranged in an alphanumeric telephone keypad layout, and the at least one input key being associated in the first mode with characters in the alphanumeric character set which are distinct from characters in the alphabetic character set with which the at least one input key is associated in the second mode;
   a second plurality of input keys, partially surrounding the first plurality of input keys, at least some of the second plurality of input keys associated in the second mode with one or more additional alphabetic characters of said alphabetic character set to form a non-standard alphabetic keyboard layout in conjunction with the first plurality of input keys, the non-standard alphabetic keyboard layout comprising at least two alphabetic characters sequentially transposed with respect to a QWERTY, QWERTZ, or DVORAK layout character sequence, the at least two alphabetic characters being associated in the second mode with separate input keys to reduce multiple word matches associated with an entered key sequence during a predictive text input process in the second mode, wherein the standard keyboard layout sequence is one of QWERTY, QWERTZ or DVORAK; and
   a memory coupled to the first and second pluralities of input keys, the memory having a dictionary from which a group of words associated with the entered key sequence can be generated during the predictive text input process; and
   wherein:
      the apparatus is further configured, as part of operation in the first mode, to allow for selection of the numeric character or one of the one or more first alphabetic characters associated with the at least one input key by receiving one or more consecutive activations of the at least one input key; and
      the apparatus is further configured, as part of operation in the second mode, to allow for input of a single character of the one or more second alphabetic characters associated with the at least one input key via a single activation of the at least one input key.

9. The apparatus of claim 8 wherein the first alphabetic characters of the alphanumeric character set comprises a set of ordered letters, each ordered letter corresponding to a DTMF signal consistent with ordered letters of a conventional telephone keypad layout.

10. The apparatus of claim 9 wherein the ordered letters of the alphanumeric character set are alphabetically ordered.

11. The apparatus of claim 9 wherein the ordered letters are arranged to provide selection of letters with a higher probability of use before letters with a lower probability of use during consecutive activations of the at least one input key.

12. The apparatus of claim 8 wherein at least one of the first and second pluralities of input keys has displayed thereon a non-numeric or nonalphabetic character.

13. The apparatus of claim 8 wherein the apparatus is a portable electronic device.

14. The apparatus of claim 8 wherein the apparatus is a wireless mobile phone.

15. The apparatus of claim 8 wherein the arrangement of the at least two alphabetic characters on said separate input keys provides a reduced set of predicted words or partial words containing at least one of the two alphabetic characters.

16. An apparatus, comprising:
   four rows of data entry keys, each of the four rows including a plurality of keys wherein at least one of the keys in the plurality of keys is assigned a first set of characters of an alphabetic keypad layout for input in a first mode of the apparatus and a second set of characters of an alphanumeric telephone keypad layout for input in a second mode of the apparatus, each of the first and second sets including at least one alphabetic character, and the second set including at least one number, wherein the first and second set of characters are not identical sets of characters;
   wherein:
      at least one of the sets of characters is the set YI, said set YI being assigned to a single data entry key; and
      the apparatus is configured, as part of operation in the first mode, to input allow for input of a single character out of the first set of characters by receiving a single activation of the at least one key;
      the apparatus is further configured, as part of operation in the second mode, to allow for selection as input of a character out of the second set of characters by receiving one or more consecutive activations of the at least one key; and
   a memory including a database of words from which a list of words associated with a key activation sequence input by a user can be generated.

17. The apparatus of claim 16 wherein the alphanumeric keypad layout includes more or more letters in an alphabetical order corresponding to a standard telephone keypad layout.

18. The apparatus of claim 16 wherein the memory including the database of words comprises a memory including one or more dictionaries from which a list of words or partial words associated with a key activation sequence can be generated.

19. The apparatus of claim 16 wherein the apparatus is a portable electronic device.

20. The apparatus of claim 16 wherein the apparatus is a wireless mobile communication device, further comprising a wireless communication interface to facilitate wireless communication with a communication station of a wireless network service provider.

21. The apparatus of claim 1, wherein said two or more alphabetic characters are associated with separate input keys to provide a reduced set of ambiguous associations between entered alphabetic characters and words or partial words containing one or more of the entered alphabetic characters in an order the alphabetic characters are entered on the keypad.

22. The apparatus of claim 1, wherein the two or more alphabetic characters are sequentially reordered in comparison to a sequence of the corresponding two or more alphabetic characters of a QWERTY, QWERTZ, DVORAK, or telephone keypad layout.

23. The apparatus of claim 1, wherein:
   the apparatus is configured to operate in the first mode to receive as input the first alphabetic character out of a first subset of alphabetic characters out of the first set of alphabetic characters;
   the apparatus is configured to operate in the second mode to receive as input the second alphabetic character out of a second subset of alphabetic characters out of the second set of alphabetic characters; and each character in the first subset of alphabetic characters is separate and distinct from each character in the second subset of alphabetic characters.

24. The apparatus of claim 8, wherein:

the at least one input key is associated with a first subset of alphabetic characters out of the one or more first alphabetic characters of the alphanumeric character set;

the at least one input key is associated with a second subset of alphabetic characters out of the one or more second alphabetic characters of the alphabetic character set; and each character in the first subset of alphabetic characters is separate and distinct from each character in the second subset of alphabetic characters.

25. The apparatus of claim 16, wherein each character in the first set of characters is separate and distinct from each character in the second set of characters.

* * * * *